Aug. 14, 1951

S. B. HANSSEN 2,564,361

SPRING SCALE ADJUSTMENT MEANS

Filed April 30, 1948

Inventor:
Stan B. Hanssen
By Hinkle, Horton, Ahlberg, Hansmann & Wupper.
Attorneys

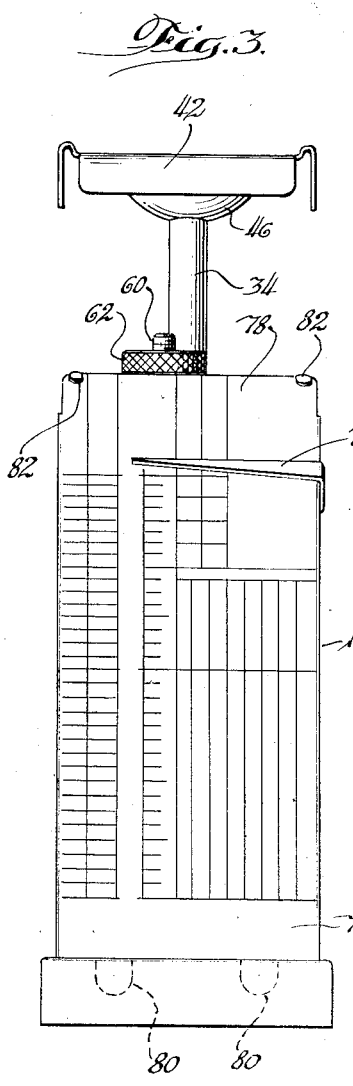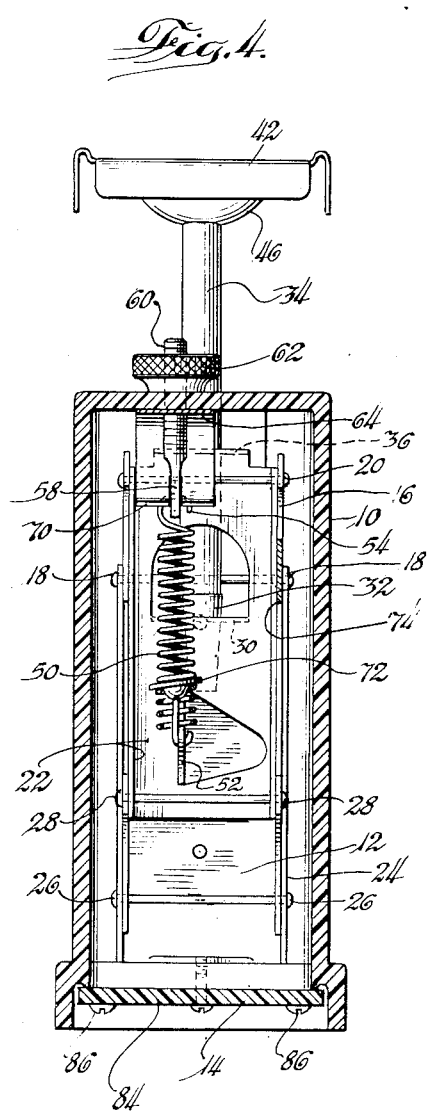

Patented Aug. 14, 1951

2,564,361

UNITED STATES PATENT OFFICE 2,564,361

SPRING SCALE ADJUSTMENT MEANS

Stan B. Hanssen, Kenilworth, Ill., assignor to Hanson Scale Company, Chicago, Ill., a corporation of Illinois Application April 30, 1948, Serial No. 24,251

1 Claim. (Cl. 265—68)

My invention pertains to postal scales, although it is not necessarily limited to such scales and may be applied to various other types of spring scales.

An object of my invention is to provide a new and improved postal scale which is more compact, attractive, and requires less storage space than the postal scales of the prior art.

Another object of my invention is to provide a new and improved postal scale wherein the platform is better protected against damage than are the platforms of the prior art scales.

Another object of my invention is to provide a new and improved postal scale which can be more easily manufactured to high standards and wherein the operating subassembly can be more easily and effectively tested prior to complete assembly of the scale.

Another object of my invention is to provide a new and improved arrangement whereby the platform-supporting spring can be more easily and effectively adjusted.

Another object of my invention is to provide improved means for preventing accidental maladjustment or disturbance of the adjustment of the platform-supporting spring.

Another object of my invention is to provide a novel construction of postal scale which is simpler and more economical to manufacture than the postal scales of the prior art.

Another object of my invention is to provide a postal scale wherein the indicator dial can be more readily changed to reflect changes in postal rates.

Another object of my invention is to provide a postal scale wherein the adjusting mechanism is more conveniently located.

Another object of my invention is to provide a postal scale wherein the operating mechanism is enclosed and cannot be readily tampered with.

Other objects and advantages will become apparent as the description proceeds.

In the drawings:

Fig. 3 is a front elevational view of the postal scale of Fig. 1; and

Fig. 4 is a vertical sectional view taken on the line 4—4 of Fig. 1.

Figure 1:
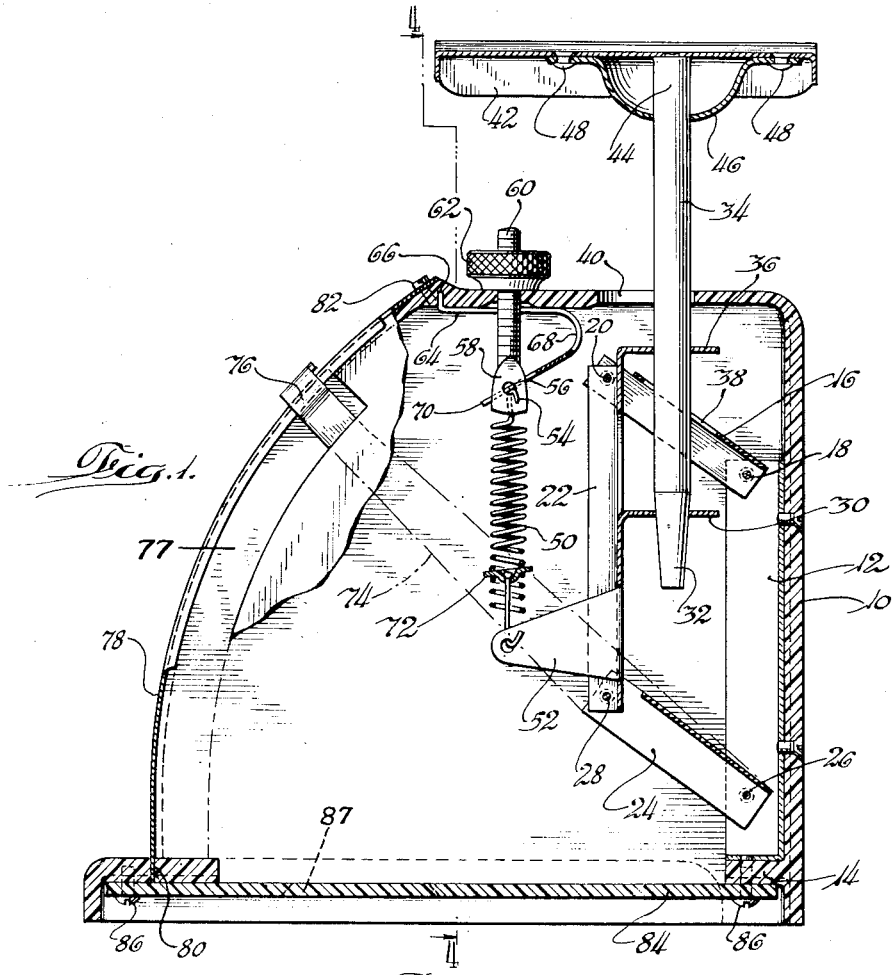
Fig. 1 is a side elevational view with part of the casing cut away to show the internal construction of a postal scale embodying my invention.

Referring to the drawings, I have illustrated therein a postal scale having a casing 10 which is illustrated as being molded of plastic material but which could be made in any other way and of any other suitable material. Mounted in the casing 10 is a bracket 12 preferably formed of sheet metal and secured by any suitable means to the rear wall of the casing 10. It will be noted that the casing 10 has an inwardly directed flange 14 upon which the lower end of the bracket 12 rests.

An upper link 16, also preferably formed of sheet metal, is pivoted at 18 to the upper end of the bracket 12 and is also pivoted at 20 to the upper end of a standard 22. A lower link 24 is pivoted at 26 to a lower portion of the bracket 12 and is also pivoted at 28 to the lower end of the standard 22, the arrangement of bracket 12, upper and lower links 16 and 24 respectively, and standard 22, being such that the standard is always in parallel relation to the bracket 12, and is freely movable in a generally vertical path defined by the pivoted links 16 and 24.

The standard 22 is provided with a laterally projecting support 30 having an opening adapted to receive the tapered lower end 32 of a platform supporting post 34. The standard 22 is also provided with a second laterally projecting member 36 having an opening freely receiving the post 34 and forming a guide therefor to hold the post in vertical position. The upper link 16 has an opening 38 through which the post freely passes and a similar opening 40 is provided in the top of the casing 10. Since the post 34 moves both downwardly and away from the rear wall of the casing 10 when the scale is in use, the openings 38 and 40 are elongated in the plane of such movement as clearly indicated in Fig. 1 of the drawings.

A platform 42 of sheet metal or other suitable material is preferably riveted or otherwise attached to the upper end of the post as indicated at 44. In the particular form of my invention which I have illustrated in the drawings, a sheet metal cup 46 is riveted at 48 to the platform 42 and closely embraces the post 34 to stabilize and reinforce the mounting of the platform thereon.

An important feature of my invention lies in the particular configuration and mounting of this platform 42. It will be noted that this platform is in general rectangular and is elongated in the direction of the main axis of the casing 10 which is likewise an elongated rectangle. Preferably, but not necessarily, the width of the platform is no greater than the width of the casing 10, thereby avoiding lateral overhanging of the platform with resulting increase in storage space and increased liability to damage to the platform.

Likewise, the platform 42 does not project rearwardly of the casing 10, and this feature likewise conserves storage space and protects the platform against accidental damage. Such arrangement of the platform is effected by the eccentric mounting of this platform on its post 34 whereby this post is offset from the center of the platform in a longitudinal direction but is central of the platform in a lateral direction.

The standard 22 and platform supported thereon are normally held in elevated position by a spring 50 attached at its lower end to an ear 52 forming an integral part of the standard 22. The upper end of the spring 50 is in the form of a hook 54 passing through the eye 56 formed in the flattened end 58 of a screw 60. This screw slides freely in a suitable opening formed in the top of the casing 10 and is held in elevated position by a knurled adjusting nut 62 which rests on the top of the casing. By manually rotating this nut 62 the screw 60 is raised or lowered and the zero position of the indicator is shifted as desired.

Another feature of my invention lies in the provision of simple and inexpensive yet effective means for preventing the scale adjustment from being changed when the scale is jarred or moved or otherwise subjected to blows or vibration which might end to change its zero adjustment. This means consists of a spring clip 64 having a turned-over end 66 extending into a suitable slot formed in the top of the casing 10. This spring clip is reversely bent upon itself as indicated at 68 and has a bifurcated end 70 formed by a slot of the same width at the reduced end 58 of the screw 60. The bifurcated end 70 of this spring clip 64 rests upon the hooked end 54 of the spring 50 and maintains a downward pull on the screw 60 and adjusting nut 62 which locks these parts in adjusted position and prevents accidental movement therebetween. The bifurcated end of this spring clip also serves to prevent any rotation of screw 60 when adjusting nut 62 is manually adjusted to change the zero position of the scale. It will be noted that the adjusting nut 62 is conveniently located and furthermore that the adjustment effected by this nut does not interfere with or in any way vary the effective length of the spring 50 as determined by the calibrating washer 72.

Figure 2:
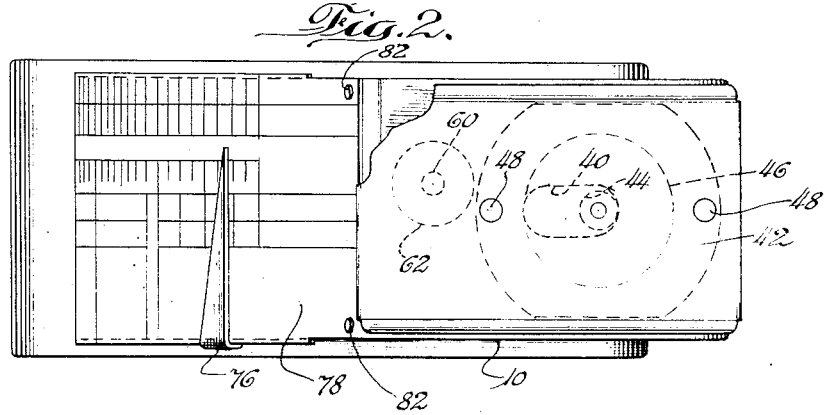
Fig. 2 is a top plan view of the postal scale of Fig. 1.

The lower link 24 is formed integral with an indicating arm 74 having a pointer-like end 76 projecting through a slot 77 in a side wall of the casing 10. As most clearly shown in Figs. 2 and 3, the pointer-like end of this indicator arm moves over a dial 78 to indicate accurately the weights of letters or other articles placed on the platform 42.

From time to time changes are made in postal rates and postal zones and it is desirable to have the dial 78 accurately reflect at all times the rates and zones currently in use. I have therefore provided a new and improved arrangement whereby the dial 78 may be readily removed and replaced by a similar dial bearing indicia reflecting any change in rates or zones.

Referring to Fig. 3 it will be noted that the lower end of the dial 78 has downwardly projecting tongues 80 slidably received in slots formed in the corresponding part of the casing 10. The upper end of the dial is secured to the casing 10 by two screws 82 so that in order to remove the dial 78 it is only necessary to unscrew the screws 82 and move the dial to withdraw the tongues 80 from the casing slots in which they are located. The new dial is installed by sliding its tongues 80 into the receiving grooves in the casing 10 and reinserting the screws 82.

It is important that the operating mechanism of the scale be not tampered with or damaged and my novel scale includes means for protecting the operating mechanism against tampering and damage. Such means comprises a plate 84 which normally closes the lower end of the hollow casing 10 and is secured in place by suitable screws 86 or any other appropriate fastening means. While this plate protects the operating parts against tampering and accidental damage, it also includes an appropriately located opening 87 to receive the post 34 and cup 46 when the scale is packaged for shipment. When so packaged, the platform is located in the recess in the casing immediately below the plate 84, and the cup 46 and post 34 project upwardly into the casing 10 in front of the spring 50.

Another feature of my invention lies in the ease with which the subassembly comprising the bracket 12, links 16 and 24, standard 22, spring 50, and pointer 74, can be assembled and calibrated before installation in the casing. In the manufacture and assembly of my improved scale, it is desirable to assemble, bench-test, and calibrate this subassembly prior to installation in the casing. This subassembly is ideally designed and arranged for such bench testing and after the calibrating washer 72 has been properly inserted in the spring 50, the complete subassembly including its calibrated spring is kept and handled as a unitary structure up to and including the moment at which it is installed in its casing 10.

While I have illustrated and described only a single embodiment of my invention, it is to be understood that my invention may assume other forms and includes all modifications, variations, and equivalents coming within the scope of the appended claim.

I claim:

A scale of the class described comprising a base, a standard movably attached to said base, a platform supported by said standard, a coil spring having one end attached to said standard, an adjusting screw having a flattened end provided with an eye through which the other end of said spring projects, said screw passing through a part rigid with said base, a nut for adjusting said screw, a U-shaped spring having a forked end straddling the flattened end of said screw and engaging the spring end attached thereto, said second spring preventing accidental changes in adjustment of said scale and facilitating intentional adjustment thereof, and indicating means associated with said standard.

STAN B. HANSSEN.

REFERENCES CITED

The following references are of record in the file of this patent:

UNITED STATES PATENTS

| Number | Name | Date |
|---|---|---|
| 289,450 | Runge | Dec. 4, 1883 |
| 729,207 | Mulligan | May 26, 1903 |
| 1,497,372 | Green | June 10, 1924 |
| 1,572,609 | Knapp | Feb. 9, 1926 |
| 1,682,506 | Hansen | Aug. 28, 1928 |
| 2,039,164 | Hansen | Apr. 28, 1936 |
| 2,098,846 | Weber | Nov. 9, 1937 |
| 2,182,590 | King | Dec. 5, 1939 |